United States Patent
Liu

(10) Patent No.: US 8,401,186 B2
(45) Date of Patent: Mar. 19, 2013

(54) CLOUD STORAGE DATA ACCESS METHOD, APPARATUS AND SYSTEM BASED ON OTP

(75) Inventor: Hui Liu, Beijing (CN)

(73) Assignee: Beijing Z&W Technology Consulting Co., Ltd., Beijing (CN)

( * ) Notice: Subject to any disclaimer, the term of this patent is extended or adjusted under 35 U.S.C. 154(b) by 279 days.

(21) Appl. No.: 12/999,249

(22) PCT Filed: Dec. 1, 2010

(86) PCT No.: PCT/CN2010/079337
§ 371 (c)(1),
(2), (4) Date: Dec. 15, 2010

(87) PCT Pub. No.: WO2012/071722
PCT Pub. Date: Jun. 7, 2012

(65) Prior Publication Data
US 2012/0134495 A1 May 31, 2012

(30) Foreign Application Priority Data
Nov. 29, 2010 (CN) .......................... 2010 1 0564668

(51) Int. Cl.
*H04L 9/00* (2006.01)
(52) U.S. Cl. .............. 380/46; 380/239; 380/37; 380/41; 726/4; 726/22; 713/166
(58) Field of Classification Search ............... 380/46, 380/270; 713/176
See application file for complete search history.

(56) References Cited

U.S. PATENT DOCUMENTS

| | | | |
|---|---|---|---|
| 6,947,559 B2 * | 9/2005 | Gleeson | 380/41 |
| 8,250,631 B2 * | 8/2012 | Iyengar et al. | 726/4 |
| 8,261,350 B2 * | 9/2012 | Wu et al. | 726/22 |
| 2006/0177065 A1 * | 8/2006 | Halbert | 380/277 |
| 2011/0119481 A1 * | 5/2011 | Auradkar et al. | 713/150 |
| 2011/0246433 A1 * | 10/2011 | Sun | 707/698 |
| 2011/0289310 A1 * | 11/2011 | Selgas et al. | 713/150 |
| 2012/0042162 A1 * | 2/2012 | Anglin et al. | 713/165 |

OTHER PUBLICATIONS

Ahmad Navin, Introducing a platform for encryption algorithms, Apr. 2008, PSU.EDU, pp. 1-3.*

* cited by examiner

*Primary Examiner* — Nathan Flynn
*Assistant Examiner* — Viral Lakhia
(74) *Attorney, Agent, or Firm* — VLP Law Group LLP; Enshan Hong

(57) ABSTRACT

The present application relates to cloud storage technology and especially relates to a cloud storage data access method, apparatus and system based on OTP. This method includes: generating and storing true random numbers of a predetermined length and a random seed of a predetermined length composed of the true random numbers via a preset method; acquiring data from the random seed for several times and cascading the data acquired each time into a true random data string of no shorter than the length of plaintext; based on the true random data string, generating a true random cryptographic key of no shorter than the length of the plaintext, encrypting the plaintext using this cryptographic key and transmitting ciphertext to a cloud storage data center. This application also provides a cloud storage data access apparatus and system based on OTP. The method, apparatus and system introduced by this invention can generate and store sufficient true random cryptographic key with relatively small physical space occupancy in comparison with that of plaintext, thereby enabling OTP to be applied into cloud storage data security protection.

6 Claims, 3 Drawing Sheets

CLOUD STORAGE DATA ACCESS METHOD, APPARATUS AND SYSTEM BASED ON OTP

RELATED APPLICATIONS

This is a U.S. National Phase Application under 35 USC §371 of International Application PCT/CN2010/079337 filed on Dec. 1, 2010.

This application claims the priority of Chinese Patent Application No. 201010564668.0, the entire content of which is hereby incorporated by reference.

TECHNICAL FIELD

This invention relates to cloud storage data security technology, and especially relates to a cloud storage data access method, apparatus and system based on OTP.

BACKGROUND OF THE INVENTION

Data has proven to be an important asset of enterprises, and the rapid growth of data has made enterprises facing unprecedented challenges. Meanwhile, the cost pressure brought by the rapidly changing world economic situation and fierce competition enables enterprises to have to consider how to reduce IT costs and meet the growing storage needs of enterprises.

The existing storage architecture can be classified into two types: one is a proprietary architecture for one party, such as the DAS (Direct Attached Storage), SAN (Storage Area Network, Storage Area Network) and NAS (Network Access Server,). Such storage systems are exclusively used by one party and can provide users with very good control, better reliability and performance, but due to their poor scalability, they do not apply to large-scale deployment; it is quite difficult for users in this mode to flexibly use storage budgets, and a one-time investment is needed to buy storage equipment; along with the increase in storage capacity, the cost control will also face challenges.

The other is a multi-party sharing architecture, that is, cloud storage architecture. According to their different service scopes, they are classified into private cloud and public cloud. The architecture of cloud storage based on network technologies (internet and intranet) provides users with on-demand purchasing and leasing of storage space, and on-demand configuration service; namely, usually, a third party or third-party department in enterprises provides storage apparatus and specialized maintenance personnel. Through the storage service, enterprises or various departments within the enterprises can significantly reduce their internal storage requirements and corresponding administrative costs, to balance the sharply rising storage requirements and business cost pressure. The users who adopt the storage service can be individuals, enterprises, or even departments within the enterprises or branch offices.

However, in either mode of operation (private cloud and public cloud), the data owners will inevitably concern about the security and privacy of its data, especially public cloud storage users whose key business data leakage may cause inestimable losses.

All existing methods to protect the cloud storage data security are to encrypt the data to be stored. However, none of existing encryption algorithms being used can be proven unbreakable, details can be seen in pages 6 and 12 of *Applied Cryptography Protocols, Algorithms and C Source Code* issued by the China Machinery Industry Press on Mar. 1, 2003. However, as decryption technology develops continuously, hardware price declines and performance rises drastically, the security of encryption algorithm will become increasingly unsafe.

In addition, in order to ensure the encryption and decryption speed of the data to be stored, the existing cloud storage services usually do not adopt the most complicated encryption algorithms within the industry, otherwise the storage performance would become relatively slow, which will add to users' concern over the reliability of encryption algorithm.

Moreover, once the users' data is stored into a cloud storage data center with some kind of encryption algorithm, it is difficult to be changed according to actual situation, e.g., the encryption algorithm used has been cracked. It should be noted that with the existing methods the file or the partial file is generally stored in the sequence of content. It can be imagined that what kind of loss it would cause once an enterprise' key business data is illegally obtained and decrypted by others.

So far, in Cryptology, only the one-time pad method (hereinafter referred to as "OTP") is mathematically proven unbreakable. For details, see U.S. Pat. No. 1,310,719, SECRET SIGNALING SYSTEM. Specifically, this method is to encrypt each bit of plaintext data with true random cryptographic key; the length of the cryptographic key should not be smaller than that of the plaintext data. Under this method, each bit of the plaintext data and the cryptographic key used are of equal probability. Therefore, no matter how many ciphertexts the cryptanalyst may have, they cannot get the unique solution. This kind of method is called unconditionally secure in cryptology.

OTP can provide perfect data security protection, but in practical application, especially, in applying into cloud storage data security protection, there are many challenges:

1. OTP encryption method requires that the length of the cryptographic key should be at least equal to the length of the encrypted plaintext, which is to say, the physical storage space of the cryptographic key of the encryption method should be no less than that of the plaintext, which contradict the users' original intention to save their local storage space by using a cloud storage service.

2. This encryption method requires sufficient, non-repeatable and true random cryptographic keys so that the cryptanalysis cannot generate the same cryptographic key according to some method.

If OTP is applied to cloud storage data security protection, the most core problem is the generation of true random cryptographic keys, which is to say, how to save and generate sufficient, unduplicated and true random cryptographic keys no shorter than the plaintext with a relatively small physical space in comparison of that of plaintext. The traditional OTP true random cryptographic key generation can be categorized into the following types:

One type is to generate one pad of certain length, and to specify the cursor position and data acquisition length one time to generate OTP cryptographic key. For details, please refer to U.S. Patent Application Publication No. U.S. 2006/0177065, System and Methods for Encrypting Data Utilizing One-Time-Pad Key, China Patent Application No. CN200610122291.7, An Improved One-time Pad Software Protection Method. This type of method, by introducing the memory address or the like, has enhanced the randomness of the cursor positions used by it. However, limited by the length of the pad, it is difficult to generate sufficient, unduplicated and true random cryptographic keys in conforming to the requirement of generating OTP cryptographic key. The cryptanalysts, when intercepting enough ciphertexts, may reversely generate the pad, which will make the security of the whole system become vulnerable.

Another type is to generate cryptographic key by pseudo-random numbers. For details, please refer to U.S Patent Application Publication No. U.S. 2003/0142821, Cryptographic One Time Pad Technique, and U.S. Pat. No. 7,197, 142, System and Methods for A Vernam Stream Cipher. However, this method disobeys the unbreakable theoretical basis of OTP, that is, all cryptographic keys used in OTP should be true random and impossibly regenerated from another place at another time. However pseudorandom number apparatus is possibly reproducible or unexpectedly intercepted by some means, which will cause the security of the whole system become vulnerable.

The third type is to generate random cryptographic keys with various methods and statically save them to a specified storage media, such as a floppy disk, CD, etc. See U.S. Pat. No. 6,324,287, Pad Encryption Method and Software. Such a method can generate sufficient real random cryptographic keys, but the storage space of the real random cryptographic keys is not smaller than that of the plaintext, which contradicts the original intention of cloud storage.

The fourth type is, under the premise of the same pad, through the identical selection procedure to choose random numbers from the same pad to generate identical random cryptographic keys at two different places. See U.S. Pat. No. 6,445,794, System and Method for Synchronizing One Time Pad Encryption Keys for Secure Communication and Access Control, U.S. Pat. No. 6,266,413, System and Method for Synchronizing One Time Pad Encryption Keys for Secure Communication and Access Control.

However, the identical random number selection procedure in this method itself causes the choosing of random data or cryptographic keys to be regular or reproducible. In case this selection procedure is leaked, then the security of the whole system will become vulnerable.

The fifth method is to focus on solving the transmission synchronization problems of the one-time pad. Still it requires a random cryptographic key no shorter than the plaintext before the transmission synchronization. See U.S. Pat. No. 6,337,910, Method and Apparatus for Generating One Time Pads Simultaneously in Separate Encryption/Decryption Systems.

The last method, though called one-time encryption one time key, its core principle is to change the cryptographic key during encryption each time, which is different from the procedure to encrypt each bit with different random cryptographic keys specified in OTP and, therefore, is not in the scope of OTP. For details, refer to China Patent Application No. 200610122291.7, One-time Pad Software Protection Method Based on Improvement.

To sum up, the present OTP cryptographic key generation methods cannot meet the requirement of cloud storage data security for OTP random cryptographic key.

SUMMARY OF THE INVENTION

This application is to provide a cloud storage data access method, apparatus and system based on OTP to address the problems that the data protection of existing cloud storage encryption technology for stored data is not strong enough, susceptible to be decrypted, and then cause the risk in data security.

This application provides a cloud storage data access method based on OTP comprising:

generating and storing true random numbers of a predetermined length and a random seed of a predetermined length formed by the true random numbers via a preset method;

acquiring data from said random seed for several times and cascading the data acquired each time into true random data string no shorter than the length of plaintext;

generating true random cryptographic key no shorter than the length of the plaintext based on the true random data string;

encrypting the plaintext with the true random cryptographic key and transmit the encrypted plaintext to a cloud storage data center.

This application provides a cloud storage data access apparatus based on OTP. The apparatus comprises:

a true random number generation module for generating and storing true random numbers of a predetermined length and a random seed of a predetermined length composed of the true random numbers via a preset method;

a true random cryptographic key generation module for acquiring data from the random seed generated by the true random number generation module for several times and cascading the data acquired each time into a true random data string no shorter than the length of plaintext, and based on the true random data string, generating the true random cryptographic key no shorter than the length of the plaintext;

an encryption module for encrypting the plaintext with the true random cryptographic key generated by the true random cryptographic key generation module and transmitting the encrypted plaintext to a cloud storage data center.

This application also provides a cloud storage data access system based on OTP. The system comprises a data transmission apparatus and a cloud storage data center; the data transmission apparatus comprises:

a true random number generation module for generating and storing true random numbers of a predetermined length and random seed of the determined length composed of the true random numbers via a preset method;

a true random cryptographic key generation module for acquiring data from random seed generated by the true random number generation module for several times and cascading the data acquired each time into a true random data string no shorter than the length of plaintext, and based on the true random data string, generating the true random cryptographic key no shorter than the length of the plaintext;

an encryption module for encrypting the plaintext with the true random cryptographic key generated by the true random cryptographic key generation module and transmitting the encrypted plaintext to the cloud storage data center.

This invention is used for cloud storage data encryption by acquiring data for several times from a predetermined length random seed composed of true random numbers generated by a preset method, generating a true random data string of no shorter than the length of plaintext, and then generating a true random cryptographic key of no shorter than the length of the plaintext based on the true random data string. Therefore, in accordance with the present invention, a true random cryptographic key has relatively smaller storage space occupancy than the plaintext. The present invention effectively strengthens cloud storage data security and privacy protection.

DETAILED DESCRIPTION OF THE PRESENTLY PREFERRED EMBODIMENTS

The following embodiments are provided to illustrate, but not to limit, the present invention.

This invention is used for cloud storage data encryption by acquiring data several times from a predetermined length random seed composed of true random numbers generated by a preset method, generating a true random data string no shorter than the length of plaintext, and then generating true random cryptographic key no shorter than the length of the plaintext based on the true random data string.

Figure 1:
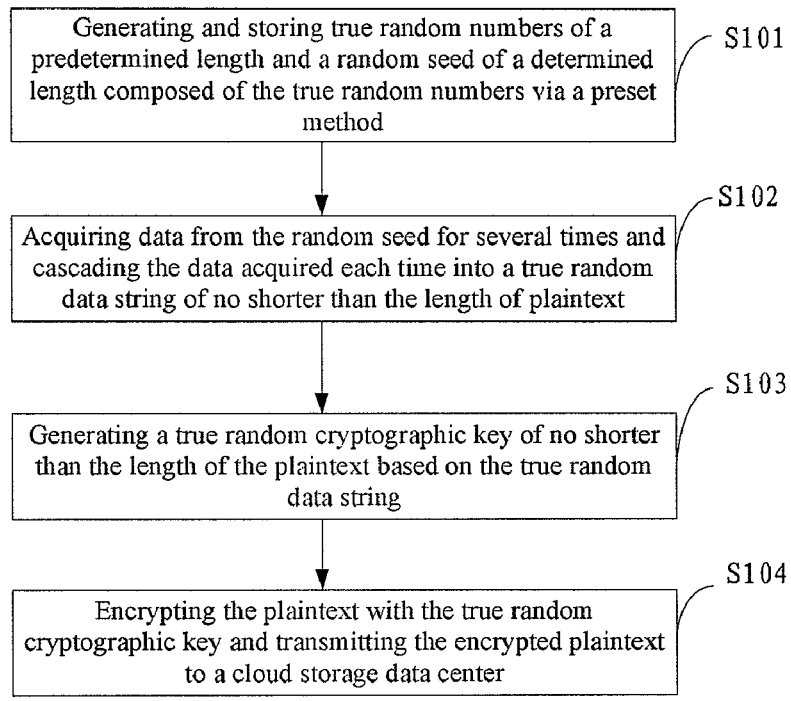
FIG. 1 is a flow chart of a cloud storage data access method based on OTP according to an embodiment of the invention.

As shown in FIG. 1, this invention provides a cloud storage data access method based on OTP, which comprises the following steps:

Step 101: generating and storing true random numbers of predetermined length via a preset method and random seed formed by true random numbers of the predetermined length. The method to generate true random number is mature. In implementation, some methods provided in page 301 of *the Applied Cryptography* published by China Machine Press on Mar. 1, 2003, such as using random noise, computer clock, CPU load or network data package reaching times, etc., can be adopted to generate the true random numbers;

In an embodiment of this invention, after generating a string of true random numbers 0, 1 of a predetermined length via a preset method, true random numbers are formed into a random seed of a predetermined length, which is stored in a random seed database for data acquisition in decryption.

Step S102, acquiring data from random seed for several times and cascading the data acquired each time into a true random numbers data string no shorter than the length of the plaintext.

Preferably, in accordance with an embodiment of this invention, when acquiring data from the stored random seed each time, the starting position of acquisition and the length of the acquired data are all random. Therefore a sufficient number of true random cryptographic keys can be generated.

In order to meet the requirement of one-time pad encryption, in accordance with an embodiment of this invention, the length of the generated true random data string is equal or greater than that of the plaintext.

In accordance with an embodiment of this invention, to further strengthen the security of data, when the generated true random data string is longer than the plaintext, the method of the present invention comprises the following steps after cascading the data acquired each time into the true random data string of the predetermined length:

acquiring data randomly from the generated true random data string again to generate a new true random data string of no shorter than the length of plaintext, and then acquiring data from the new true random data string to generate true random cryptographic key of no shorter than the length of plaintext.

Users may also repeat the above steps as required to acquire data from the true random data string no shorter than the plaintext and generate true random data string of no shorter than the length of plaintext to generate the true random cryptographic keys.

Step 103: generating a true random cryptographic key of no shorter than the length of the plaintext based on the true random data string.

In order to meet the requirement of one-time pad encryption, in accordance with an embodiment of this invention, the length of the generated true random data string is equal or greater than that of the plaintext, namely, no shorter than the length of the plaintext.

When the length of the true random data string is equal to that of the plaintext, the true random data string may be directly chosen as the true random cryptographic key; when the length of the true random data string is greater than that of the plaintext, the true random data string may be directly used as the true random cryptographic key; or the true random data string may be traversed from a random starting position of the true random data string, and the true random data string whose length is equal to that of the plaintext is taken as the true random cryptographic key.

Step S104: encrypting the plaintext with the true random cryptographic key and transmitting the encrypted plaintext to a cloud storage data center.

In accordance with an embodiment of the invention, after generating true random cryptographic key, one may use the generated true random cryptographic key and the encryption function relevant to the true random cryptographic key to encrypt the plaintext and transmit it to a predetermined cloud storage data center for storage, meanwhile save the information concerning the one-to-one correspondence relationship between the cryptographic key and the plaintext.

According to an embodiment of this invention, after receiving an external access request to retrieve ciphertext stored, one may find cryptographic key required to decrypt the ciphertext according to the plaintext, and call the decryption function to decrypt and recover the ciphertext, based on the information about the one-to-one correspondence relationship between the cryptographic key and the plaintext saved during the encryption process.

The corresponding relationship between ciphertext and plaintext can be obtained with a method, e.g., using the same filename identification or ID, etc., or saving a copy of the correspondence relationship between ciphertext and plaintext after the encryption.

As an embodiment of this invention, after generating true random cryptographic key, one may also determine whether the true random cryptographic key has been generated or not, if yes, then again repeatedly acquire data from the random seed to generate true random cryptographic key; if not, output and save the true random cryptographic key.

Figure 2:
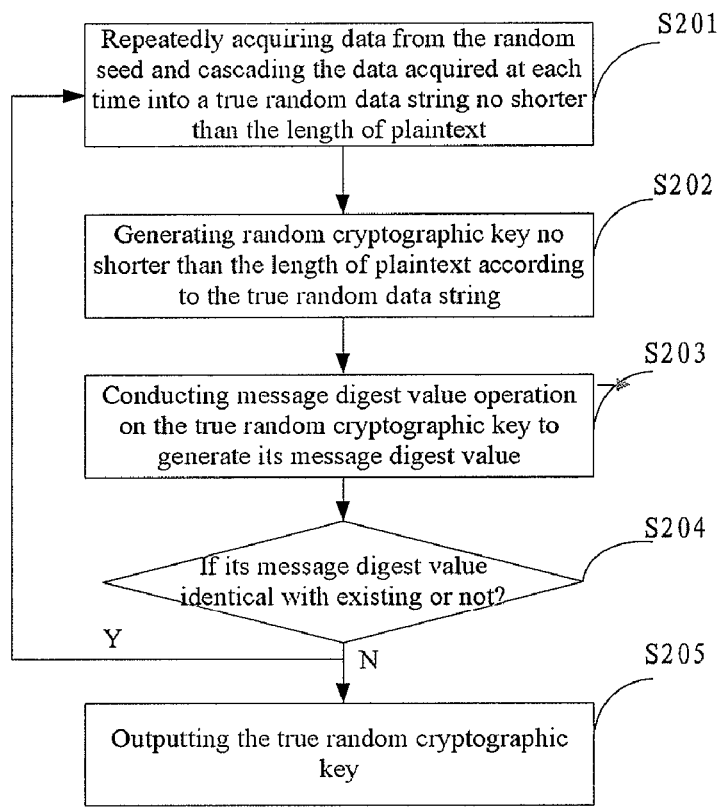
FIG. 2 is a flow chart of a method to determine whether a true random cryptographic key is generated according to an embodiment of the invention.

The detailed implementation steps are shown in FIG. 2:

Step S201: acquiring data from random seed for several times and cascading the data acquired at each time into true random numbers data string no shorter than the length of the plaintext.

Step 202: generating true random cryptographic key no shorter than the length of the plaintext based on the true random data string.

Step S203: conducting the message digest value operation on the true random cryptographic key to generate the message digest value of the true random cryptographic key.

Step S204: determining whether the message digest value is identical to the previously stored message digest value of the true random cryptographic key, if so, then executing step S201, otherwise executing step S205.

Step S205: outputting the true random cryptographic key.

In accordance with an embodiment of this invention, MD5, SHA1 algorithms or the like may be adopted for message digest value calculation of the true random cryptographic key.

Figure 3:
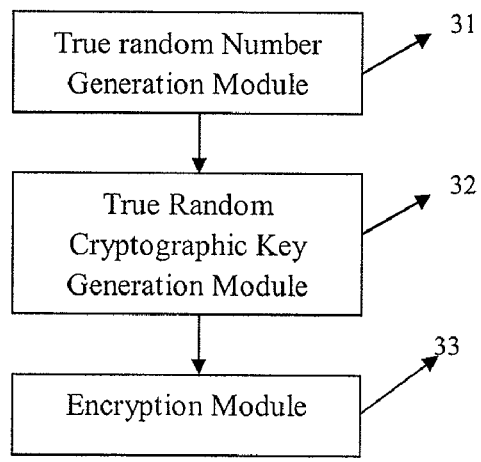
FIG. 3 is a structural diagram of a cloud storage data access apparatus based on OTP according to an embodiment of the invention.

As shown in FIG. 3, this invention provides a cloud storage data access apparatus based on OTP. For the convenience of explanation, only the part relevant to this invention is given here.

This apparatus comprises: true random number generation module 31, true random cryptographic key generation module 32 and encryption module 33.

True random number generation module 31 is used to generate and store true random numbers of a predetermined length via a preset method and a random seed formed by the true random numbers of the predetermined length. True random cryptographic key generation module 32 is used to acquire data for several times from random seed generated by the true random number generation module 31, to cascade the data acquired at each time into true random data string no shorter than the length of plaintext, and based on the true random data string, to generate the true random cryptographic key no shorter than the length of plaintext;

Encryption module 33 is used to encrypt the plaintext with the true random cryptographic key generated by the true random cryptographic key generation module 33 and transmit it to a cloud storage data center.

The true random cryptographic key generation module 32 comprises:

Acquisition unit 34, used to acquire data for several times from random seed generated by the true random number generation module 31 and output the acquired data;

Cascading unit 38, used to receive the data passed by the acquisition unit 34, cascade the data into true random data string no shorter than the length of plaintext and output the true random data string; and Encryption key generation unit 39, used to receive the true random data string passed by the cascading unit and, according to the true random data string, generate the true random cryptographic key no shorter than the length of plaintext.

Further, the true random cryptographic key generation module 32 also comprises:

Determining unit 40, used to determine whether the true random data string cascaded by the cascading unit 38 is longer than the length of plaintext, if yes, then randomly acquire data for several times from the true random data string to generate the new true random data string no shorter than the length of plaintext and output the new true random data string to the encryption key generation unit 39.

Figure 4:
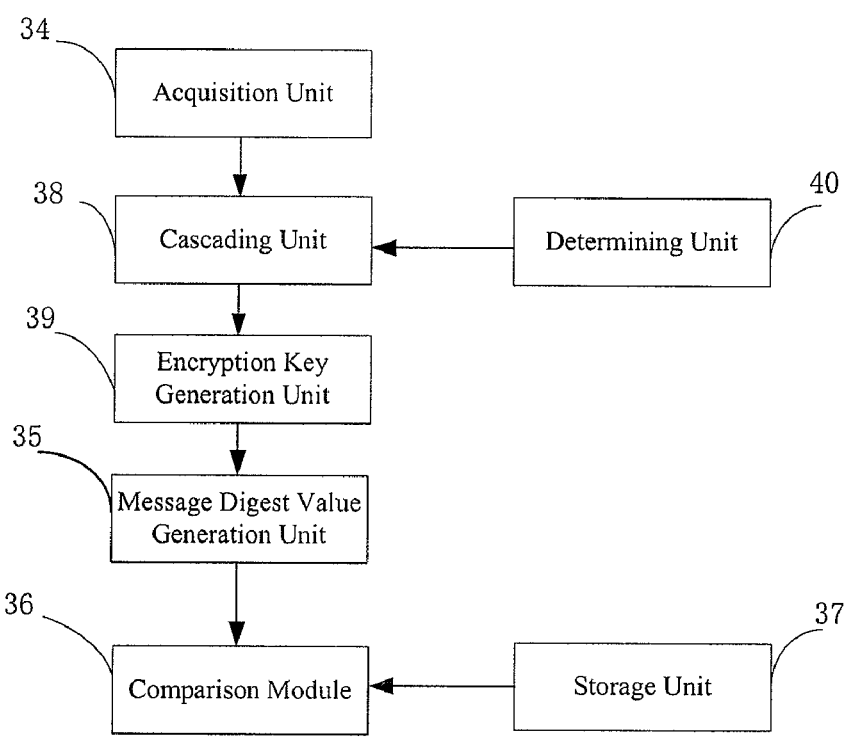
FIG. 4 is a structural diagram of a true random cryptographic key generation module according to an embodiment of the invention.

As shown in FIG. 4, the true random cryptographic key generation module 32 also comprises:

Storage unit 37, used to store the message digest value of the true random cryptographic key;

Message digest value generation module 35, used to conduct message digest value operation for the true random cryptographic key generated by encryption key generation unit 39 to generate the message digest value of the true random cryptographic key and output it; and Comparison module 36, used to receive the message digest value passed by the message digest value generation module 35, compare the message digest value with the message digest value stored by the storage unit 37 and output the comparison result to the encryption key generation unit 39.

After finishing the above encryption procedures, as an embodiment of this invention, the generated true random cryptographic key and the information about the correspondence relationship between the true random cryptographic key and the plaintext will also be stored. This information is used to decrypt the encrypted data retrieved later.

Figure 5:
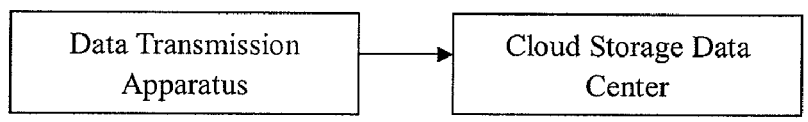
FIG. 5 is a structural diagram of a cloud storage data access system based on OTP according to an embodiment of the invention.

As shown in FIG. 5, this invention provides a cloud storage data access system based on OTP. This system comprises a data transmission apparatus and a cloud storage data center. The data transmission apparatus comprises:

a true random number generation module, used to generate and store true random numbers of determined length according to preset methods and random seed formed by true random numbers of determined length;

a true random cryptographic key generation module, used to acquire data for several times from random seed generated by the true random number generation module and cascade the data acquired at each time into true random data string no shorter than the length of plaintext, and according to the true random data string, generate the true random cryptographic key no shorter than the length of plaintext; and an encryption module, used to encrypt the plaintext with the true random cryptographic key generated by the true random cryptographic key generation module and transmit it to the cloud storage data center.

The true random cryptographic key generation module comprises:

an acquisition unit, used to acquire data for several times from random seed generated by the true random number generation module and output the acquired data;

a cascading unit, used to receive the data passed by the acquisition unit, cascade the data into true random data string no shorter than the length of plaintext and output the true random data string; and an encryption key generation unit, used to receive the true random data string passed by the cascading unit and, according to the true random data string, generate the true random cryptographic key no shorter than the length of plaintext.

The application of transmission apparatus based on OTP into the cloud storage system has not only strengthened the data encryption security of the cloud storage but also met the requirement for users adopting cloud storage service, which is to store data that occupies most physical space into the cloud storage data center and store the information about the encryption with relatively small space in local, and then save users' local storage space.

To further elaborate this invention, two methods in accordance with embodiments of this invention will be introduced to generate true random cryptographic keys. The protection scope of this invention is not limited to these two, methods.

Method 1: Fixed-Time Fixed-Length True Random Cryptographic Key Generation Method In this embodiment, the length of generated true random cryptographic key is fixed, more specifically, equal to the length of the plaintext.

In the following m, n, p are natural numbers, where, m is the length of random seed, l is the required length of the random key (in this embodiment equal to the plaintext length), p is the random key bits already generated, l–p is the random key remaining bits to acquire.

First, one may generate a predetermined m-bit true random number (in fact, 0 or 1) string by the true random number generation module, and store it as random seed into random seed database.

The true random cryptographic key generation module will make n-time random data acquisition from the random seed, if the data acquisition is made to the tail of the random number string, then one may go back to the head of the random seed to proceed with the acquisition, and cascade the data acquired at each time into the determined l-bit true random data string, namely the true random cryptographic key (in this embodiment, l is the length of the plaintext).

Message digest value generation module will conduct the message digest value operation on the true random cryptographic key generated by the true random cryptographic key generation module with algorithms like MD5, SHA1, etc., to generate the message digest value of the true random cryptographic key and pass it to the comparison module;

Comparison module will compare the message digest value passed by the message digest value generation module with the stored message digest value of the true random cryptographic key, and determine whether they are identical or not; if yes, then feedback the information of comparison failure to the true random cryptographic key generation module, and the true random cryptographic key generation module will repeatedly make random acquisition from the random seed to generate new random cryptographic key; if not, then output the true random cryptographic key and its message digest value.

Before data acquisition each time, one embodiment of the invention requires to generate two true random numbers with the true random number generation module, and then make modulo operation on these two true random numbers to get the starting cursor position needed and the data length to be acquired for data acquisition each time. The starting cursor position and the data length to be acquired at each time (may greater than or equal to 0) are all random.

It is assumed before the data acquisition, two random numbers R1 and R2 have been generated, then two random numbers T1 and T2 respectively less than m and l–p should be generated, then $$T1 = R1 \bmod m$$

$$T2 = R2 \bmod (l-p)$$

wherein mod is the modulo operation.

Figure 6:
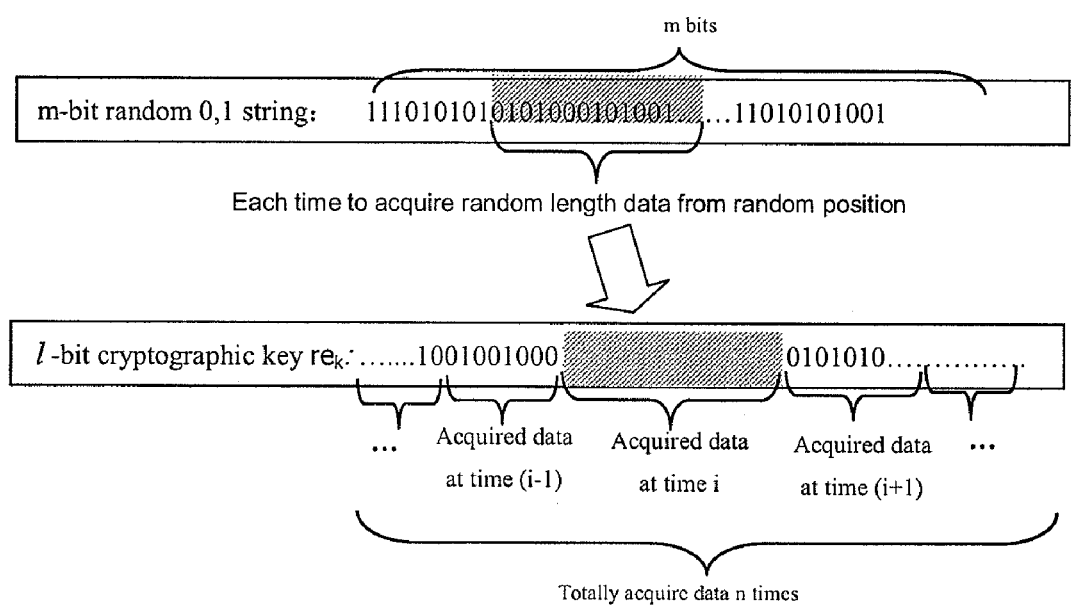
FIG. 6 is a flow chart of a method to acquire data from a true random data string according to an embodiment of the invention.

As shown in FIG. 6, one may identify the true random cryptographic key that corresponds to plaintext k as $re_k$ (k is a natural number), then $re_k$ is equal to the cascading of the data acquired for n times from the random seed of determined length. One may identify the data acquired from the random seed at the time i as $(Cur_s, Cur_e)_i$. Here $Cur_s$ is the starting cursor position of the time i data acquisition in the random seed, and $Cur_e$ is, accordingly, the ending cursor position of the time i data acquisition. $Cur_s$ and $Cur_e$ are all identified with the offset from the head of the random seed, so both $Cur_e$ and $Cur_e$ are integers greater than or equal to 0 and less than or equal to m, and $Cur_s$ is greater than or equal to $Cur_e$. When $Cur_s$ is equal to $Cur_e$, the number of bit of the data acquisition is 0. Then the data acquired at the time i is the data between $Cur_s$ and $Cur_e$ in the random seed of determined length. Further, $re_k$ may be expressed as:

$$re_k = [(Cur_s, Cur_e)_1, (Cur_s, Cur_e)_2, \ldots (Cur_s, Cur_e)_i, \ldots (Cur_s, Cur_e)_n]_{k \circ}$$

In order to prove the feasibility of true random cryptographic key generation method in accordance with an embodiment of this invention, a further analysis will be made in the following on the physical storage space occupied by the true random cryptographic keys generated in comparison with the plaintext.

Assuming that 1 MB (equal to 8,000,000 bit) cryptographic key is generated to encrypt a plaintext of 8 Mbit (equal to 8,000,000 too); the size of the random seed used is 1 Gbit, namely 1000,000,000 bits random numbers string (in fact, a string of 0, 1); and the generation of each true random cryptographic key requires 100 times of data acquisition, i.e. n=100.

Then, the physical space occupied by each cursor position is not greater than 4 bytes. Therefore, cursor's expression at each data acquisition needs to occupy a physical space no greater than 8 bytes. Total physical space is not greater than 800 bytes after 100 times of acquisition, less than 1024 bytes (i.e. 1 KB). Further, it can be calculated that in this embodiment, true random cryptographic keys occupy physical storage space of less than 1:1000 space of the plaintext. Alternatively, true random cryptographic keys need physical storage space less than 1/1000 of that of plaintext to be stored.

As can be seen from above, the physical storage space needed by true random cryptographic keys is only related to the length of the random seed and the times of the random data acquisition. Therefore, the smaller the plaintext to be encrypted is, the larger the occupancy of the physical storage space required by the true random cryptographic key to the plaintext is, and vice versa.

On the other hand, increasing the length of the random seed and the times of the random data acquisition can effectively enhance the randomness of the true random cryptographic key and further strengthen the security of the overall system. In practice, users can set the length of the random seed and times of the random data acquisition, namely the value of m and n.

Next, a detailed analysis is made on the true randomness/irreproducibility of the true random cryptographic key and the usable number of the true random cryptographic keys.

As long as the characters that can be used as the true random cryptographic keys are limited, the true random cryptographic keys should be reproducible. The randomness of the cryptographic key lies in the small probability and irregularity of reproducibility.

Assuming the true random cryptographic key has 1024 bits, as the true random cryptographic key is composed by only two binary number, 0 and 1, no matter how high the randomness is, the reproducibility of the cryptographic keys will be greater than $1/2^{1024}$, namely $1/(1.79*10^{308})$.

In this embodiment, the data used in the true random cryptographic key generation process comprises true random numbers, because each data acquisition from random seed may have m possibilities, then the repeatability probability of the cryptographic key is $1/m^n$. That is, using the sample data of above, the smallest repeatability probability of the random cryptographic key $re_k$ generated with this method is $1/10^{900}$, or in another word, the maximum number of different random cryptographic keys can be generated is $10^{900}$. From this, it is arguable that repeatability probability of random cryptographic key is small enough, which can meet the requirements under most conditions and conforms to the characteristics of randomness.

In practical application, users may improve the randomness of the random cryptographic keys by increasing the value of m and n to reduce their repeatability probability, or regularly change the random seed to ensure a safer true random cryptographic key.

Method 2: Fixed-Time Variable-Length True Random Cryptographic Key Generation Method In this embodiment, the length of the generated true random cryptographic key is greater than that of the plaintext. The main steps are described below.

First, a predetermined m-bit true random number (in fact, 0 or 1) string is generated by the true random number generation module, and stored as random seed into random seed database.

The true random cryptographic key generation module makes determined times of random data acquisition from the random seed. If the data acquisition has been made to the tail of the random number string, then back to the head of the random seed to proceed with the acquisition; then cascade the data acquired at each time into the non fixed l-bit true random data string (in this embodiment, l is the greater than the length of the plaintext).

Message digest value generation module will conduct the Message digest value operation on the true random cryptographic key generated by the true random cryptographic key generation module with algorithms like MD5, SHA1, etc., to generate the message digest value of the true random cryptographic key and pass it to the comparison module.

Comparison module will compare the message digest value passed by the message digest value generation module with the stored message digest value, and determine whether they are identical or not; if yes, then feedback the information of comparison failure to the true random cryptographic key generation module, and the true random cryptographic key generation module will again make random acquisition from the random seed to generate new random cryptographic key; if not, then output the true random cryptographic key and its message digest value.

Before data acquisition each time, an embodiment of the invention requires generating two true random numbers with the true random number generation module, and then making modulo operation on these two true random numbers to get the starting cursor position needed and the data length to be acquired for data acquisition each time. The starting cursor position and the data length to be acquired each time (may greater than or equal to 0) are all random.

Assuming before the data acquisition, two random numbers R1 and R2 have been generated, then two random numbers T1 and T2 less than m (m is the length of the random seed) should be generated, then $$T1 = R1 \bmod m$$

$$T2 = R2 \bmod m$$

wherein mod is the modulo operation.

Under method 2, the storage space occupied by the random cryptographic key depends on the size of the physical space occupied by each cursor poison, and times of data acquisition, for there is no difference between method 2 and method 1 at these two places. Therefore, under method 2, the physical storage space occupied by true random cryptographic key is the same with that under the method 1, which is to say, storage space occupied by the true random cryptographic key is quite small comparing to the plaintext as under method 1; meanwhile, the true randomness, irreproducibility and available number of the true random cryptographic keys are the same with that of the analysis under method 1, namely, high irreproducibility and randomness and large number of cryptographic keys.

To further enhance date security, when the generated true random data string is longer than the plaintext, this embodiment allows another repeated random data acquisition from the above random data string to generate a new true random data string no shorter than the length plaintext to use it for data acquisition and generate true random cryptographic key no shorter than the length of plaintext.

In addition, users may, according to requirement in implementation, repeat the above steps to make random data acquisition from the true random data string generated each time to generate the desired true random data string and further generate true random cryptographic key.

These two methods are just two typical embodiments, in implementation, users can also adopt non-fixed data acquisition times and fixed length true random cryptographic key generation method, where n is not fixed, l is fixed; or non-fixed data acquisition times and non-fixed length true random cryptographic key generation method, where both n and l are not fixed; or encrypt the plaintext with after cryptographic key after its determined times of operation.

The true random cryptographic key, after generated, will be distributed to the predetermined plaintext for plaintext encryption. Each plaintext will correspond to one true random cryptographic key. According to the OTP encryption requirement, the cryptographic key should be securely saved, transmitted and destroyed (each cryptographic key can only be used for one time).

In the cloud storage system, users can always find a user-controlled and safe location (such as the user's local PC) to save important and sensitive data. In fact, all data including the sensitive and critical business data, before being moved to cloud storage servers, are stored in some user-controlled and safe locations of the users.

Cryptographic keys transmission. As data encryption and decryption are both taken by data owner, the cryptographic keys do not need to be transmitted.

Cryptographic key destroy. Its main purpose is to avoid repeatable use of the cryptographic key. In the above implementation, it can be seen that the true random cryptographic key corresponding to each plaintext is generated by the true random cryptographic key generation module, therefore possibility of repeatable generation is very small (the minimum duplication probability is $1/10^{900}$, and without any regularity), and the generated cryptographic keys, having been compared and treated by the comparison module, which will make sure cryptographic key is not repeatedly used. Thus, the purpose of destroying the cryptographic key is achieved.

In short, by applying the "one-time pad" cloud storage to the cloud storage field, users can find suitable method (such as more strict management, authentication and authorization system, and even encryption, etc.) to save all random seeds used and the information about the correspondence relationship between the cryptographic keys and plaintexts required by data decryption in a secured location controlled by a user (such as a location at local PC); because the true random cryptographic key can only be used for one time, the purpose of the cryptographic key destruction is achieved.

When the data needs to be decrypted, then, based on the one-to-one correspondence relationship between cryptographic key and plaintexts saved at the time of data encryption, one may find the cryptographic key required to decrypt the ciphertext according to plaintext. The correspondence relationship between plaintext and ciphertext can be obtained with certain methods, such as the same identification filename or ID, etc., or saving a copy of the correspondence relationship between plaintext and ciphertext after the plaintext encryption.

In method 1, encryption and decryption functions may be worked out with XOR operation, or plus or minus, etc., to support the fixed-length random cryptographic keys.

In method 2, the encryption and decryption functions need to support variable-length true random cryptographic key, for example, one may abandon the bits which exceeds the length of he plaintext or make one more encryption operation from the head of the plaintext, append enough 0 to cryptographic key if its length is not enough; if its length exceeds the plaintext, one may recursively call the above steps until all the bits of the cryptographic key have been used. After obtaining the cryptographic key to decrypt, one then may call the corresponding decryption function through a decryption apparatus and recover ciphertext into plaintext.

In conclusion, by the above implementation, the one-time pad encryption method can be applied into data security and privacy protection of cloud storage to provide perfect secrecy.

By repeating random data acquisition from generated random seed for predetermined times to generate true random data string no shorter than the length of plaintext, and then generating true random cryptographic key no shorter than the length of plaintext with the true random data string, and applying the true random cryptographic key for cloud storage data encryption, this invention has achieved the purpose of generating and saving sufficient and non-repeatable true random cryptographic keys with relatively small storage space occupancy comparing to the plaintext, and further achieved the application of OTP data encryption method into cloud storage filed to effectively protect data security and privacy and reduce users' losses. In addition, compared with traditional encryption methods this invention can also reduce the complexity of encryption function used to improve the speed of data encryption and decryption.

The above preferred embodiments should not be used to limit the scope of this invention. Any modification, identical replacement and improvement, etc., based on the spirit and principles of this invention, shall be included in the protection scope of this invention.

The invention claimed is:

1. A cloud storage data access method based on OTP comprising:
   generating and storing in a computer true random numbers of a predetermined length and a random seed of a determined length composed of the true random numbers via a preset method;
   acquiring data from the random seed for several times and cascading the data acquired each time into a true random data string of no shorter than the length of plaintext;
   generating a true random cryptographic key of no shorter than the length of the plaintext based on the true random data string; and
   encrypting the plaintext with the true random cryptographic key and transmitting the encrypted plaintext to a cloud storage data center;
   wherein the step of cascading comprises:
   determining whether the length of the true random data string is greater than that of the plaintext, if yes, then randomly acquiring data from the true random data string for several times to generate a new true random data string of no shorter than that of the plaintext; and
   the step of generating the true random cryptographic key is based on the new random data string.

2. The method of claim 1 wherein the starting position of data acquisition from the random seed and the length of the acquired data are all random.

3. The method of claim 1 wherein the step of generating the true random cryptographic key comprises:
   conducting message digest operation on the true random cryptographic key to generate the message digest value of the true random cryptographic key; and
   determining whether the message digest value is identical to a previously stored message digest value of the true random cryptographic key, if not, outputting the true random cryptographic key generating in the conducting step; if yes, then repeatedly acquiring data from the random seed for several times to generate an additional true random cryptographic key and determining whether the additional and the previously stored message digest values of the true random cryptographic key are the same, until a different true random cryptographic key is generated.

4. A cloud storage data access apparatus based on OTP comprising:
   a true random number generation module for generating and storing true random numbers of a predetermined length and random seed of a predetermined length composed of the true random numbers via a preset method;
   a true random cryptographic key generation module for acquiring data from the random seed for several times and cascading the data acquired each time into a true random data string of no shorter than the length of plaintext, and based on the true random data string, generating a true random cryptographic key of no shorter than the length of the plaintext; and
   an encryption module for encrypting the plaintext with the true random cryptographic key and transmitting the encrypted plaintext to a cloud storage data center;
   wherein the true random cryptographic key generation module comprises:
   an acquisition unit for acquiring data from the random seed for several times and outputting the acquired data;
   a cascading unit for receiving the data output by the acquisition unit, cascading the output data into a true random data string of no shorter than the length of the plaintext, and outputting the true random data string;
   an encryption key generation unit for receiving the true random data string output by the cascading unit and, based on the true random data string, generating the true random cryptographic key; and
   a determining unit for determining whether the true random data string cascaded by the cascading unit is longer than the plaintext or not, if yes, then randomly acquiring data from the true random data string for several times to generate a new true random data string of no shorter than the length of plaintext and outputting the new true random data string to the encryption key generation unit.

5. The apparatus of claim 4 wherein the true random cryptographic key generation module also comprises:
   a storage unit for storing a message digest value of the true random cryptographic key;
   a message digest value generation module for conducting message digest value operation for the true random cryptographic key to generate and output the message digest value of the true random cryptographic key; and
   a comparison module for receiving the message digest value output by the message digest value generation module, comparing the message digest value with a message digest value previously stored in the storage unit, and outputting the comparing result to the encryption key generation unit.

6. A cloud storage data access system based on OTP comprising a data transmission apparatus and a cloud storage data center, wherein the data transmission apparatus comprises:
   a true random number generation module for generating and storing true random numbers of a predetermined length and a random seed of a predetermined length composed of the true random numbers via a preset method;
   a true random cryptographic key generation module for acquiring data from the random seed for several times and cascading the data acquired each time into a true random data string of no shorter than the length of plaintext, and based on the true random data string, generating a true random cryptographic key of no shorter than the length of the plaintext; and
   an encryption module for encrypting the plaintext with the true random cryptographic key and transmit the encrypted plaintext to a cloud storage data center;

wherein the true random cryptographic key generation module comprises:

an acquisition unit for acquiring data from the random seed for several times and outputting the acquired data;

a cascading unit for receiving the data output by the acquisition unit, cascading the output data into a true random data string of no shorter than the length of the plaintext, and outputting the true random data string;

an encryption key generation unit for receiving the true random data string output by the cascading unit and, based on the true random data string, generating the true random cryptographic key; and a determining unit for determining whether the true random data string cascaded by the cascading unit is longer than the plaintext or not, if yes, then randomly acquiring data from the true random data string for several times to generate a new true random data string of no shorter than the length of plaintext and outputting the new true random data string to the encryption key generation unit.

* * * * *